United States Patent
Sun et al.

(10) Patent No.: US 9,742,583 B2
(45) Date of Patent: Aug. 22, 2017

(54) METHOD OF DATA RETRANSMISSION IN COLLABORATIVE SERVICE TRANSMISSION AND ACCESS NETWORK GATEWAY THEREOF

(71) Applicant: ZTE Corporation, Shenzhen, Guangdong (CN)

(72) Inventors: Aifang Sun, Shenzhen (CN); Jingwei He, Shenzhen (CN); Chong Gao, Shenzhen (CN); Zhihao Ling, Shenzhen (CN); Zhifei Zhang, Shenzhen (CN); Xuewen Qi, Shenzhen (CN); Jianfu Cao, Shenzhen (CN); Yifeng Yuan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 160 days.

(21) Appl. No.: 14/761,293

(22) PCT Filed: Jul. 22, 2013

(86) PCT No.: PCT/CN2013/079786
§ 371 (c)(1),
(2) Date: Jul. 15, 2015

(87) PCT Pub. No.: WO2013/167065
PCT Pub. Date: Nov. 14, 2013

(65) Prior Publication Data
US 2015/0365250 A1    Dec. 17, 2015

(30) Foreign Application Priority Data
Jan. 17, 2013  (CN) .......................... 2013 1 0017711

(51) Int. Cl.
*H04W 72/12*    (2009.01)
*H04L 12/28*    (2006.01)
(Continued)

(52) U.S. Cl.
CPC ........ *H04L 12/2869* (2013.01); *H04L 12/287* (2013.01); *H04L 12/6418* (2013.01);
(Continued)

(58) Field of Classification Search
CPC ... H04L 12/2869; H04L 65/102; H04L 49/90; H04L 12/6418; H04L 12/287; H04W 76/023; H04W 36/02
See application file for complete search history.

(56) References Cited

U.S. PATENT DOCUMENTS 6,532,493 B1 *   3/2003  Aviani, Jr. ............. H04L 29/06
                                                        370/396
7,600,040 B1    10/2009  Henry
(Continued)

FOREIGN PATENT DOCUMENTS

CN         1949698 A      4/2007
CN       101001135 A      7/2007
(Continued)

OTHER PUBLICATIONS

International Search Report in international application No. PCT/CN2013/079786, mailed on Oct. 24, 2013.
(Continued)

*Primary Examiner* — Jay P Patel
(74) *Attorney, Agent, or Firm* — Oppedahl Patent Law Firm LLC

(57) ABSTRACT

The present invention discloses a method of data retransmission in coordination service transmission and access network gateway thereof. Wherein, the method includes: in coordination service transmission, access network gateway receives the service data requested by the coordination terminal, caches the data and transmits it to the corresponding destination terminal; the access network gateway executes retransmission strategy, and when decides data
(Continued)

retransmission is needed, retransmits the cached data to the corresponding destination terminal. The access network gateway is used to receive the service data requested by the coordination terminal, to cache the data and transmit it to the corresponding destination terminal, to retransmit the cached data to the corresponding destination terminal when data retransmission is needed. Using the present invention, to the problem of service data retransmission in coordination service transmission, the service data transmission efficiency is effectively improved.

11 Claims, 3 Drawing Sheets

(51) Int. Cl.
*H04L 12/64* (2006.01)
*H04L 29/06* (2006.01)
*H04W 76/02* (2009.01)
*H04L 12/861* (2013.01)
*H04W 36/02* (2009.01)

(52) U.S. Cl.
CPC ............ *H04L 49/90* (2013.01); *H04L 65/102* (2013.01); *H04W 76/023* (2013.01); *H04W 36/02* (2013.01)

(56) References Cited

U.S. PATENT DOCUMENTS

| | | | | |
|---|---|---|---|---|
| 8,200,838 | B2* | 6/2012 | Ludwig | H04L 1/1858 370/231 |
| 2004/0199808 | A1* | 10/2004 | Freimuth | H04B 1/74 714/4.11 |
| 2005/0213586 | A1* | 9/2005 | Cyganski | H04L 41/0896 370/395.41 |
| 2007/0110074 | A1* | 5/2007 | Bradley | H04L 29/06027 370/395.51 |
| 2008/0170501 | A1* | 7/2008 | Patel | H04L 1/1874 370/235 |
| 2009/0279429 | A1* | 11/2009 | Griffoul | H04L 29/08846 370/230 |
| 2010/0002650 | A1 | 1/2010 | Ahluwalia | |
| 2010/0014485 | A1 | 1/2010 | Henry | |
| 2010/0279672 | A1 | 11/2010 | Koskela | |
| 2012/0155432 | A1 | 6/2012 | Ahluwalia | |
| 2012/0163342 | A1 | 6/2012 | Ahluwalia | |
| 2012/0163343 | A1 | 6/2012 | Ahluwalia | |
| 2013/0083677 | A1* | 4/2013 | Kim | H04W 72/1284 370/252 |
| 2013/0136125 | A1* | 5/2013 | Jain | H04L 47/38 370/392 |
| 2013/0176848 | A1* | 7/2013 | Jinzaki | H04L 47/193 370/230.1 |
| 2013/0315139 | A1* | 11/2013 | Abraham | H04B 7/0452 370/328 |
| 2015/0055628 | A1 | 2/2015 | Ahluwalia | |

FOREIGN PATENT DOCUMENTS

| | | |
|---|---|---|
| CN | 101047484 A | 10/2007 |
| CN | 102801692 A | 11/2012 |
| CN | 102823207 A | 12/2012 |
| JP | H06252917 A | 9/1994 |
| JP | 2001339752 A | 12/2001 |
| JP | 2009141707 A | 6/2009 |
| JP | 2010135947 A | 6/2010 |

OTHER PUBLICATIONS

English Translation of the Written Opinion of the International Search Authority in international application No. PCT/CN2013/079786, mailed on Oct. 24, 2013.
Supplementary European Search Report in European application No. 13788462.3, mailed on Jan. 5, 2016.
TCP Performance Degradation of In-Sequence Delivery in L TE Link Layer,International Journal of Advanced Science and Technology ,mailed on Dec. 1, 2011.
Radio Link Control (RLC) protocol specification (3GPP TS 36.322 version 10.0.0 Release 10),Technical Specification , European Telecommunications Standards Institute(ETSI) , 650 ,Route Des Lucioles F-06921 Sophia-Antipolis France ,vol. 3GPP RAN 2, No. VI0.0.0 , Jan. 1, 2011.
Evolved Universal Terrestrial Radio Access Network (E-UTRAN) Radio Access Network (E-UTRAN); Overall description;Stage 2 (3G PP TS 36.300 version 10.5.0 Release 10), ETSI TS 136 300 VI0.5.0 , vol. 50 , Oct. 3, 2011.

* cited by examiner

METHOD OF DATA RETRANSMISSION IN COLLABORATIVE SERVICE TRANSMISSION AND ACCESS NETWORK GATEWAY THEREOF

TECHNICAL FIELD

The disclosure relates to a retransmission technology, and more particular to a method of data retransmission in collaborative service transmission and an access network gateway.

BACKGROUND

With the development of information technology, terminal devices have been generally mounted with various communication interfaces. It has become a method for improving transmission efficiency to simultaneously perform transmission of a collaborative service using a plurality of interfaces of a plurality of terminals through cooperation of the terminals so as to achieve an aggregation effect of a plurality of links.

In the transmission oriented to the collaborative service, during the cooperation of the plurality of terminals, a wireless link for cooperation may be affected by co-frequency interference or a channel characteristic and a large amount of data in the link may be lost during the transmission of the collaborative service because of the mobility of terminals for cooperation. Thus, a lost data packet needs to be retransmitted in time in order to ensure sequential transmission of user services. Therefore, various transmission protocols of a transmission layer are all provided with a corresponding rapid retransmission strategy. During the data transmission oriented to the collaborative service, after a collaborative terminal applies for a service, the requested service data is transmitted to each target terminal by a service server via an original path or a switched path. Data retransmission is required if there is data loss. The service server executes a retransmission strategy. A retransmission process is the same as the foregoing data transmission process and a transmission path is shown by a thick solid line in FIG. 1.

With respect to the data retransmission during the transmission oriented to the collaborative service, since there is a relatively long transmission time delay in link transmission, if the retransmission process is the same as the foregoing data transmission process, a transmission path for the retransmission is too long and thus the transmission path and the transmission time delay may reduce the transmission performance to further affect the data transmission efficiency. The aggregation effect brought by the collaborative transmission of the plurality of terminals can be hardly reflected effectively, especially in a data transmission process that requires higher real time.

SUMMARY

In view of this, the embodiments of the disclosure are intended to provide a method of data retransmission in collaborative service transmission and an access network gateway, so as to improve the transmission efficiency of data effectively with regard to data retransmission during transmission oriented to a collaborative service.

To this end, the embodiments of the disclosure are implemented as follows.

A method of data retransmission in collaborative service transmission includes the following steps.

In collaborative service transmission, an access network gateway receives data of a service requested by a collaborative terminal, and transmits the data to target terminals after caching the data.

The access network gateway executes a retransmission strategy, determines that data retransmission is required and retransmits the cached data to a corresponding target terminal.

According to an embodiment of the disclosure, the step of determining that the data retransmission is required includes the following steps.

When the access network gateway receives response messages from target terminals, if serial numbers in the response messages are discontinuous, it is indicated that there is a loss in the data transmitted to the target terminals and it is determined that the data retransmission is required.

According to an embodiment of the disclosure, the step of caching the data specifically includes that partitioned caching is performed by Internet Protocol (IP) addresses, wherein the IP addresses are specifically IP addresses of the target terminals.

According to an embodiment of the disclosure, when the access network gateway changes, the method further includes that a target access network gateway accesses an original IP address via an access terminal, inquires a service server for an original access network gateway, and establishes a data link with the original access network gateway; when the data which needs to be retransmitted passes through the data link, the original access network gateway transmits the data to the corresponding target terminal via forwarding of the target access network gateway, and empties a retransmission queue cache area after the retransmission succeeds.

An access network gateway is provided, wherein the access network gateway is configured to receive data of a service requested by a collaborative terminal, to transmit the data to target terminals after caching the data, to determine that data retransmission is required, and to retransmit the cached data to the corresponding target terminal.

According to an embodiment of the disclosure, the access network gateway specifically includes a new data cache area, an information processing unit and a retransmission queue cache area.

The new data cache area is configured to cache new data received from a service server side.

The retransmission queue cache area is configured to cache the data that has been transmitted to the corresponding target terminal.

The information processing unit is configured to determine, according to serial numbers of response messages from target terminals, that the data retransmission is required, and to retransmit the cached data to the corresponding target terminal.

According to an embodiment of the disclosure, the information processing unit is further configured to, when the serial numbers in the response messages are discontinuous, determine that there is a loss in the data transmitted to the target terminals and the data retransmission is required, and to acquire the corresponding data from the retransmission queue cache area to perform the data retransmission.

According to an embodiment of the disclosure, the retransmission queue cache area is further configured to perform transmission prior to transmission of the new data in the new data cache area, wait for the response message from the target terminal, and empty the cached data in the retransmission queue cache area when the data is successfully transmitted to the target terminals.

According to an embodiment of the disclosure, the new data cache area is further configured to transmit the new data to a corresponding target terminal after the cached data in the retransmission queue cache area is emptied and to copy the new data to a corresponding retransmission queue cache area.

According to an embodiment of the disclosure, there are at least two retransmission queue cache areas partitioned by IP addresses of the target terminals.

A method according to an embodiment of the disclosure includes that, in collaborative service transmission, an access network gateway receives data of a service requested by a collaborative terminal, and transmits the data to target terminals after caching the data, wherein the access network gateway executes a retransmission strategy, and when determining that data retransmission is required, retransmits the cached data to the corresponding target terminal.

According to the embodiments of the disclosure, the access network gateway is used to execute the retransmission strategy, which is different from the prior art in which a service server is used to execute a retransmission strategy. When it is determined that the data retransmission is required, the access network gateway retransmits the cached data to the corresponding target terminal. As such, a data retransmission path is shortened, and thus a transmission time delay is reduced. Therefore, the transmission efficiency of data can be improved effectively.

DETAILED DESCRIPTION

In the embodiments of the disclosure, in collaborative service transmission, an access network gateway receives data of a service requested by a collaborative terminal, and transmits the data to target terminals after caching the data. Further, the access network gateway executes a retransmission strategy, and when it is determined that data retransmission is required, retransmits the cached data to a corresponding target terminal.

Implementation of the technical solutions will be further described in detail below in combination with the accompanying drawings.

Figure 2:
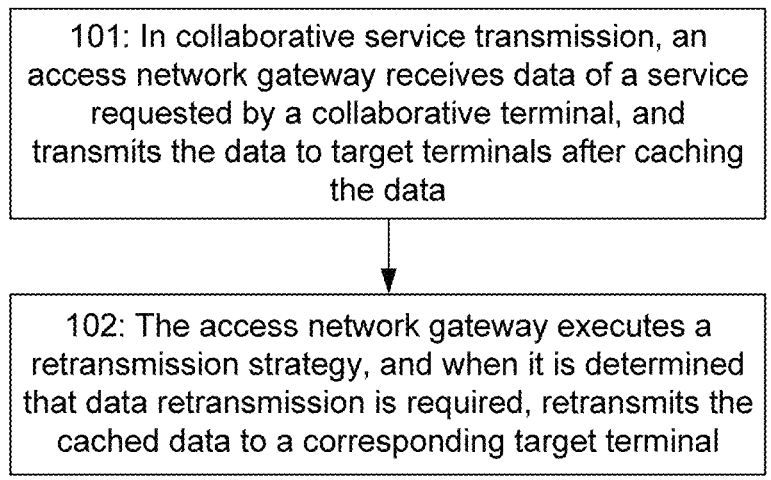
FIG. 2 is a schematic diagram of an implementation process based on a principle of a method according to an embodiment of the disclosure.

FIG. 2 shows a method of data retransmission in collaborative service transmission. The method mainly includes the following steps.

Step 101: In collaborative service transmission, an access network gateway receives data of a service requested by a collaborative terminal, and transmits the data to target terminals after caching the data.

Step 102: The access network gateway executes a retransmission strategy, and when determining that data retransmission is required, retransmits the cached data to a corresponding target terminal.

Method Embodiment the present embodiment is a complete embodiment of a retransmission method according to the disclosure, which includes the following steps.

Step 201: A collaborative terminal requests a service, and the requested service data is transmitted to target terminals by a service server via an access network gateway.

Herein, the access network gateway will cache the received data in this step. Received new data may be cached by a new data cache area of the access network gateway, and is copied to a corresponding retransmission queue cache area. The new data cache area can forward the new data to a corresponding target terminal only after the retransmission queue cache area is emptied. That is, the data for retransmission is transmitted prior to the new data, wherein there are at least two retransmission queue cache areas partitioned by IP addresses of target terminals. Therefore, the new data cache area caches new data received from the service server side and copies the new data to a corresponding retransmission queue cache area, which means that the new data is copied to the retransmission queue cache area distinguished by and corresponded to an IP address of the target terminal. In this way, if the response messages returned by the target terminals are received later and it is determined that there is data loss, the retransmission queue cache area corresponding to the IP address of the target terminal may be found according to an IP address in a response message returned by the target terminal. An information processing unit may execute data retransmission according to the data for retransmission cached in the retransmission queue cache area.

Noted that herein, both the new data cache areas and the retransmission queue cache areas may be partitioned by IP addresses so as to distinguish respective target terminals to which data is transmitted. The IP addresses may be addresses of a plurality of target terminals. That is, the access network gateway parses, after receiving the new data, an IP address of a target terminal to which the data is transmitted, and then caches the received data into corresponding cache areas according to the IP address.

Generally, it is believed that a plurality of terminals participating in collaboration all need to be connected to a core network via one or more access network gateways having stronger processing and storage capabilities than a common terminal.

Step 202: The access network gateway receives response messages from the target terminals.

Herein, the response messages from the target terminals may be received by the information processing unit of the access network gateway in this step.

Step 203: The access network gateway determines whether there is data loss and whether it is necessary to perform data retransmission according to the response messages from the target terminals. If the data is successfully transmitted to the corresponding target terminal, Step 204 is executed. Otherwise, Step 205 is executed.

Herein, the step of determining may be performed by the information processing unit of the access network gateway.

The information processing unit determines whether the data is successfully transmitted according to the response messages from the target terminals, empties a corresponding retransmission queue cache area if the data is transmitted successfully, and retransmits the lost data via the retransmission queue cache area if there is data loss.

Step 204: The access network gateway empties the corresponding retransmission queue cache areas.

Step 205: The access network gateway retransmits the lost data.

Herein, Step 204 and Step 205 are implemented via the retransmission queue cache areas of the access network gateway. The retransmission queue cache areas are different from the new data cache area included in the access network gateway. Specifically, the new data cache area is configured to temporarily store the new data received from the service server side, waits and forwards the new data to the corresponding target terminal until the corresponding retransmission queue cache area is emptied, and copies the new data to the corresponding retransmission queue cache area to be stored temporarily. However, the priority of a retransmission queue cache area is higher than that of the new data cache area. That is, the data for retransmission is transmitted prior to the new data. The new data can be transmitted only after the corresponding retransmission queue cache area is emptied. The retransmission queue cache area is configured to temporarily store service data transmitted to a target terminal, wait for a response message from the target terminal, and empty a retransmission queue cache area if the transmission succeeds, and retransmit lost data otherwise.

Further, when the access network gateway of the terminal changes (i.e. network switching occurs) because the terminal moves or a peripheral network environment changes, the method further includes the following content.

Network switching is performed because the terminal moves or the network environment changes, and the access network gateway changes (hereinafter, the previous access network gateway is called as an original access network gateway, and a new access network gateway is called as a target access network gateway).

The target access network gateway accesses an original IP address via an access terminal, and inquires the service server for the original access network gateway, and establishes a data link with the original access network gateway.

The data that needs to be retransmitted is transmitted to the target terminal by the original access network gateway via forwarding of the target access network gateway, and the retransmission queue cache area is emptied after the retransmission succeeds.

An access network gateway is configured to implement determination and execution of a data retransmission decision. The access network gateway may be compatible with an existing multi-stream concurrent transmission protocol (e.g. Stream Control Transmission Protocol (SCTP), Multipath Transmission Control Protocol (MPTCP) and so on) so as to enable the access network gateway to cache a data stream to a connected terminal device and to complete rapid data retransmission when there is data loss.

The access network gateway includes an information processing unit, a new data cache area and a retransmission queue cache area. The access network gateway allocates two cache areas (the new data cache area and the retransmission queue cache area) for each of target terminals connected, and partitions the cache areas by the IP addresses of the target terminals.

The information processing unit is configured to receive response messages from the target terminals with respect to received data packets, distinguish the cache areas corresponding to different target terminals according to IP addresses of the response messages, determine whether there is loss in the data packets according to serial numbers of the received packets in the response messages, and formulate retransmission decisions to control operations of emptying retransmission queue cache areas or push retransmission data to corresponding target terminals. Herein, the operation of determining whether there is loss in the data packets according to the serial numbers refers to that if the serial numbers are discontinuous, it is indicated that there is data loss, and data needs to be retransmitted to a target terminal corresponding to a missing serial number.

The new data cache area is configured to temporarily store new data received from a service server side, and forward the new data to a corresponding target terminal after a retransmission queue cache area is emptied, and copy the new data to the corresponding retransmission queue cache area to be stored temporarily.

The retransmission queue cache area is provided with a higher priority than the new data cache area. That is, data for retransmission is transmitted prior to the new data. The new data may be transmitted only after the retransmission queue cache area is emptied. The retransmission queue cache area is configured to temporarily store data transmitted to a target terminal, wait for a response message from the target terminal, empty the retransmission queue cache area if the data is transmitted successfully, and retransmit lost data otherwise.

Figure 1:
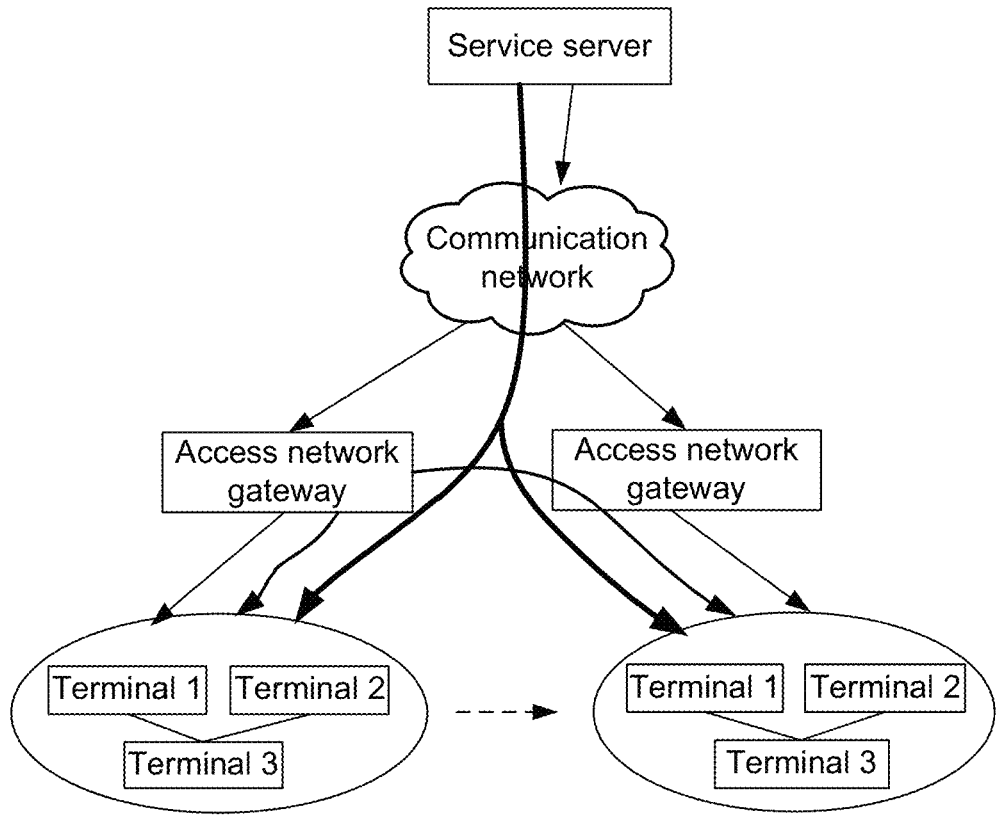
FIG. 1 is a schematic diagram of a data transmission path according to an embodiment of the disclosure compared with the prior art.

To sum up, a method of data retransmission and an access network gateway provided by the embodiments of the disclosure can improve transmission efficiency effectively. As shown by the solid lines in FIG. 1, when a retransmission decision is determined and executed by the access network gateway, since the access network gateway and a target terminal are within a range of one to two hops, information regarding service loss at the terminal may be acquired in time, the retransmission decision may be made as soon as possible, and data retransmission may be performed via an optimized link, thereby saving a bandwidth between a server and a communication network and retransmission time, improving transmission performance, and having excellent effect especially for a collaborative service that requires higher real time performance.

Specific examples will be described in detail below.

Figure 3:
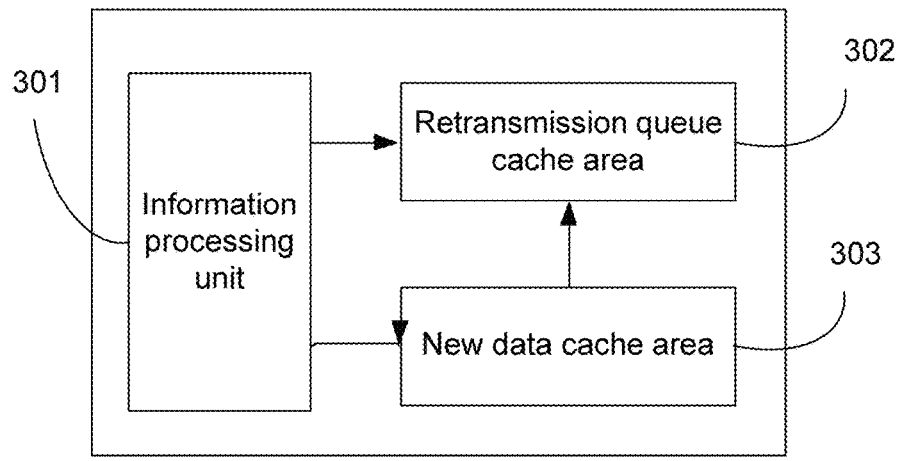
FIG. 3 is a structural diagram of components in a system according to an embodiment of the disclosure.

FIG. 3 shows a structural diagram of components of an access network gateway according to an embodiment of the disclosure. The access network gateway in this embodiment includes an information processing unit 301, a retransmission queue cache area 302, and a new data cache area 303.

The information processing unit 301 is configured to receive response messages from connected terminal devices in a perception extension layer for received data packets, distinguish caches areas of different terminals via IP addresses of the response messages, determine whether there is loss of data packets according to serial numbers of the received packets in the response messages, and formulate a retransmission decision to control operations of emptying the retransmission queue cache area or pushing retransmission data to a corresponding terminal device.

The retransmission queue cache area 302 is provided with a higher priority than the new data cache area. That is, the data for retransmission is transmitted prior to the new data. The new data may be transmitted only after the retransmission queue cache area is emptied. The retransmission queue cache area is configured to temporarily store data transmitted to a target terminal, wait for a response message from the target terminal, empty the cache area if the data is transmitted successfully, and retransmit lost data otherwise.

The new data cache area 303 is configured to temporarily store new data received from a server side, and forward the new data to a corresponding target terminal after the retransmission queue cache area is emptied, and copy the new data to the corresponding retransmission queue cache area to be stored temporarily.

Application Example 1 a scenario in which various modules in an access network gateway perform retransmission decision and execution.

Figure 4:
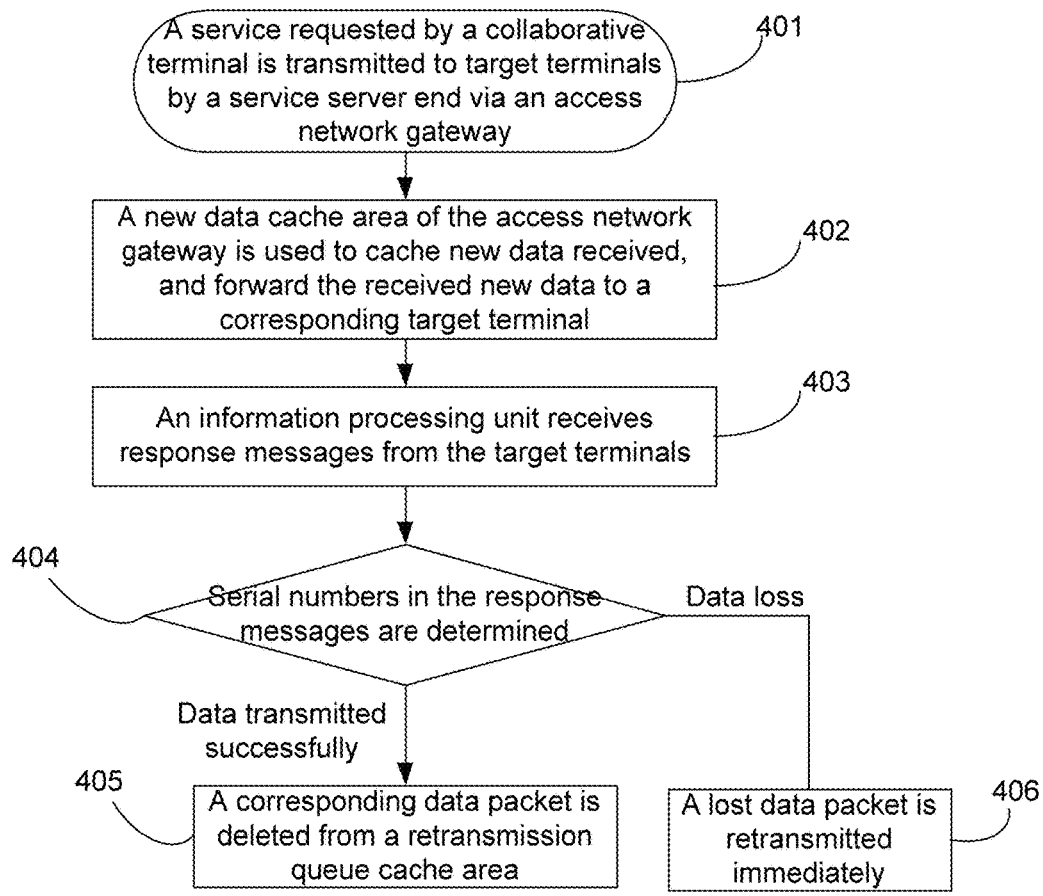
FIG. 4 is a schematic diagram of an implementation process of the first application example of the method according to an embodiment of the disclosure.

The present example is shown in FIG. 4, and includes the following steps.

Step 401: A service requested by a collaborative terminal is transmitted to target terminals by a service provider server end via the access network gateway.

In this step, it is generally believed that a plurality of terminals participating in collaboration all need to be connected to a core network via one or more access network gateways having stronger processing and storage capabilities than a common terminal.

Step 402: A new data cache area of the access network gateway is configured to cache new data received, and forward the received new data to a corresponding target terminals.

After receiving the new data, the access network gateway first parses IP addresses of target terminals to which the data is transmitted, and then caches the data into the corresponding cache area according to the IP addresses. Since the new data cache area has a lower priority than a retransmission queue cache area, the data in the new data cache area may be transmitted only after data in the retransmission queue cache area is emptied.

Step 403: An information processing unit receives response messages from the target terminals.

Step 404: The information processing unit determines whether the data is transmitted successfully according to serial numbers of the response messages of the target terminals. Step 405 is executed if the data is transmitted successfully and Step 406 is executed if there is data loss.

Step 405: A corresponding retransmission queue cache area is emptied.

Step 406: Lost data is retransmitted via the retransmission queue cache area.

Application Example 2

A scenario in which the service continuity is maintained after network switching.

Figure 5:
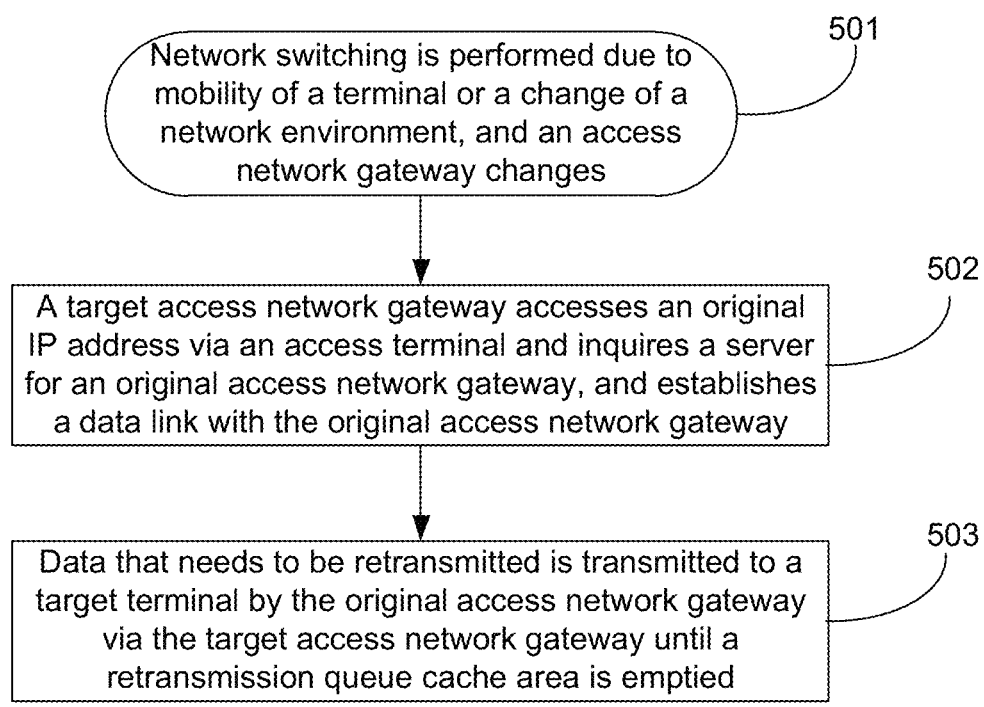
FIG. 5 is a schematic diagram of an implementation process of the second application example of the method according to an embodiment of the disclosure.

The present example is shown in FIG. 5 and includes the following steps.

Step 501: A network is switched due to mobility of a terminal or a change of a network environment, and thus an access network gateway changes.

Step 502: A target access network gateway accesses an original IP address via an access terminal and inquires a server for an original access network gateway, and establishes a data link with the original access network gateway.

Step 503: Data that needs to be retransmitted is transmitted to a target terminal by the original access network gateway via the target access network gateway until a retransmission queue cache area is emptied.

What are described above are only preferred embodiments of the disclosure, but are not used for limiting the protection scope of the disclosure.

INDUSTRIAL APPLICABILITY

According to the embodiments of the disclosure, an access network gateway executes a retransmission strategy, and when it is determined that data retransmission is required, retransmits the cached data to a corresponding target terminal. According to the embodiments of the disclosure, the access network gateway is used to retransmit the cached data to the corresponding target terminal when it is determined that the data retransmission is required, which is different from the prior art in which a service server is used to execute a retransmission strategy. Since a data retransmission path is shortened, a transmission time delay is reduced and thus the data transmission efficiency can be improved effectively.

What is claimed is:

1. A method of data retransmission in collaborative service transmission, comprising:

in the collaborative service transmission, caching, by a new data cache memory of an access network gateway, data of a service requested by a collaborative terminal, wherein the data is new data received from a service server side, transmitting, by the new data cache memory, the data to target terminals when a retransmission queue cache memory of the access network gateway is emptied, and then copying the data to the retransmission queue cache memory for caching; wherein the data that has been transmitted to the target terminals is cached in the retransmission queue cache memory;

executing, by an information processor of the access network gateway, a retransmission strategy, determining that data retransmission is required, and retransmitting the cached data in the retransmission queue cache memory to a corresponding target terminal.

2. The method according to claim 1, wherein the step of determining that the data retransmission is required comprises:

receiving, by the information processor of the access network gateway, response messages from the target terminals, and determining that there is a loss in the data transmitted to the target terminals and the data retransmission is required when serial numbers in the response messages are discontinuous.

3. The method according to claim 1, wherein the step of caching the data comprises: performing partitioned caching according to Internet Protocol (IP) addresses, wherein the IP addresses are the IP addresses of the target terminals.

4. The method according to claim 1, wherein when the access network gateway changes, the method further comprises: accessing, by a target access network gateway, an original IP address via an access terminal, inquiring a service server for an original access network gateway, and establishing a data link with the original access network gateway; when the data which needs to be retransmitted passes through the data link, transmitting, by the original access network gateway, the data to the corresponding target terminal via forwarding of the target access network gateway, and emptying a retransmission queue cache area after the retransmission succeeds.

5. An access network gateway, wherein the access network gateway comprises:

a new data cache memory configured to cache data of a service requested by a collaborative terminal, wherein the data is new data received from a service server side, and to transmit the data to target terminals when a retransmission queue cache memory is emptied and then to copy the data to the retransmission queue cache memory for caching;

the retransmission queue cache memory is configured to cache the data that has been transmitted to the target terminals;

an information processor configured to determine that data retransmission is required, and to retransmit the cached data in the retransmission queue cache memory to a corresponding target terminal.

6. The access network gateway according to claim 5, wherein the information processor is further configured to determine, according to serial numbers of response messages from the target terminals, that the data retransmission is required, and to retransmit the cached data in the retransmission queue cache memory to the corresponding target terminal.

7. The access network gateway according to claim 6, wherein the information processor is further configured to, when the serial numbers in the response messages are discontinuous, determine that there is a loss in the data transmitted to the target terminals and the data retransmission is required, and to acquire the corresponding data from the retransmission queue cache memory to perform the data retransmission.

8. The access network gateway according to claim 6, wherein the retransmission queue cache memory is further configured to perform transmission prior to transmission of the new data in the new data cache memory, wait for the response message from the target terminal, and empty the cached data in the retransmission queue cache memory when the data is successfully transmitted to the corresponding target terminal.

9. The access network gateway according to claim 6, wherein the new data cache memory is further configured to transmit the new data to a corresponding target terminal after the cached data in the retransmission queue cache area is emptied and to copy the new data to a corresponding retransmission queue cache memory.

10. The access network gateway according to claim 9, wherein there are at least two retransmission queue cache memories partitioned by Internet Protocol (IP) addresses of target terminals.

11. The method according to claim 2, wherein the step of caching the data comprises: performing partitioned caching according to Internet Protocol (IP) addresses, wherein the IP addresses are the IP addresses of the target terminals.

* * * * *